United States Patent [19]

Kothmann et al.

[11] 4,276,355

[45] Jun. 30, 1981

[54] FUEL CELL SYSTEM CONFIGURATIONS

[75] Inventors: Richard E. Kothmann, Churchill Borough; Joseph A. Cyphers, Pittsburgh, both of Pa.

[73] Assignee: Westinghouse Electric Corp., Pittsburgh, Pa.

[21] Appl. No.: 144,089

[22] Filed: Apr. 28, 1980

[51] Int. Cl.³ .............................................. H01M 8/06
[52] U.S. Cl. ......................................... 429/26; 429/35
[58] Field of Search ................................... 429/26, 35

[56] References Cited

U.S. PATENT DOCUMENTS

| | | | |
|---|---|---|---|
| 3,394,032 | 7/1968 | Danner | 136/86 |
| 3,468,712 | 9/1969 | Gillespie | 136/86 |
| 3,516,867 | 6/1970 | Dankese | 136/86 |
| 3,554,809 | 1/1971 | Craft | 136/86 |
| 3,692,585 | 9/1972 | Mayo | 136/86 R |
| 3,801,374 | 4/1974 | Dews et al. | 136/120 FC |
| 3,880,670 | 4/1975 | Shinn | 136/86 R |
| 3,945,844 | 3/1976 | Nickols, Jr. | 136/86 R |
| 3,964,929 | 6/1976 | Grevstad | 136/86 R |
| 3,994,748 | 11/1976 | Kunz et al. | 429/13 |
| 4,002,493 | 1/1977 | Warzawski | 429/26 |
| 4,074,020 | 2/1978 | Regnaut | 429/34 |
| 4,080,487 | 3/1978 | Reiser | 429/16 |
| 4,101,718 | 7/1978 | Tamura et al. | 429/26 |
| 4,169,917 | 10/1979 | Baker et al. | 429/26 |
| 4,182,795 | 1/1980 | Baker et al. | 429/13 |

*Primary Examiner*—Charles F. LeFevour
*Attorney, Agent, or Firm*—Edward L. Levine

[57] ABSTRACT

Fuel cell stack configurations having elongated polygonal cross-sectional shapes and gaskets at the peripheral faces to which flow manifolds are sealingly affixed. Process channels convey a fuel and an oxidant through longer channels, and a cooling fluid is conveyed through relatively shorter cooling passages. The polygonal structure preferably includes at least two right angles, and the faces of the stack are arranged in opposite parallel pairs.

15 Claims, 9 Drawing Figures

FUEL CELL SYSTEM CONFIGURATIONS

GOVERNMENT CONTRACT

This invention was made or conceived in the course of, or under, a contract with the United States Government, identified as ET-78-C-03-2031.

CROSS-REFERENCE TO RELATED APPLICATIONS

This disclosure is closely related to concurrently filed U.S. Patent Application in the name of R. E. Kothmann, entitled "Variable Area Fuel Cell Process Channels," further identified by Ser. No. 144,088, and to concurrently filed U.S. Patent Application Ser. No. 144,088, also in the name of R. E. Kothmann, entitled "Variable Area Fuel Cell Cooling," Ser. No. 144,088, both of which are hereby incorporated by reference.

BACKGROUND OF THE INVENTION

*Description of the Prior Art*

Among the various types of fuel cell systems are those which include subassemblies of two bipolar plates between which is supported an acid electrolyte in a matrix. The subassemblies, herein referred to as fuel cells, are oriented one atop another and electrically connected, typically in series, to form a fuel cell stack. Operation of the fuel cell, for example, the reaction of hydrogen and oxygen to produce heat, electrical energy and water, is exothermic, and cooling of the cell components is necessary in order to maintain component integrity. Liquid or gaseous cooling fluids have therefore been passed through the stack to remove heat. Accordingly, three fluid mediums, a fuel, an oxidant and a cooling fluid flow in some manner into and out of the fuel cell stack.

As a result of system design limitations, such as the geometric configuration and the need to provide sufficient cooling, fluid streams have typically been combined or require relatively complex sealed ducting configurations to direct flow of the various fluid mediums. For example, systems have been proposed wherein the cooling fluid and oxidant are the same medium, such as air. Such systems require a high circulatory power, detracting from overall system efficiency, and can subject downstream components, such as heat exchangers, to undesirable reaction products carried with the depleted oxidant. Further, in combined systems providing energy generation utilizing the waste heat removed from the fuel cell stack, it is desirable to recover the heat at a high temperature, which is limited by excessive air flow rates. Other systems, such as that described in U.S. Patent No. 4,074,020, require flow paths which enter a longitudinal end of the stack, flow radially through selected sections of the stack, and are discharged longitudinally, creating multiple flow paths and large pressure drops. Multiple, spaced inlets and outlets also require complex ducting.

Accordingly, it is desirable to provide fuel cell systems which alleviate these concerns. Such systems advantageously should simplify system construction and promote system efficiency.

SUMMARY OF THE INVENTION

This invention provides fuel cell stack configurations which simplify construction and sealed ducting requirements, while improving system efficiency. In preferred form, a plurality of fuel cells are provided in a stack, with a cooling module periodically positioned between two selected fuel cells. The cross-sectional shape of the stack, in each individual cell or module, is that of an elongated polygon having opposite sides which are parallel. Preferably the polygon is a rectangle or a hexagon where the across flats dimension is shorter between one pair of opposed faces than between the remaining pairs. In either arrangement a cooling fluid, such as air, is ducted into and out of the closer faces by manifolds which seal to the stack through gaskets at the corners. In the hexagonal arrangement manifolds are sealed to the stack with corner gaskets and fuel flows through one pair of opposite faces and oxidant through the remaining pair. The rectangular arrangement includes, in addition to corner gaskets, gaskets attached to the central longitudinal portion of the short sides of the rectangle, so that fuel and oxidant ducts are arranged side by side on the short faces. In this manner the fuel and oxidant flow through the long cross-sectional dimension of the stack, and the cooling fluid flows through the short dimension.

Flow within channels defined by the plates forming the fuel cells and the cooling modules preferably follows a flow path which is generally parallel and perpendicular to the various sides of the stack. Particularly in the rectangular configuration, the fuel and oxidant flow through similarly shaped channels having an inlet segment and a generally parallel outlet segment joined by a perpendicular crossover segment. The crossover segment may include multiple passages for each singular inlet or outlet passage.

The elongated polygonal configuration provides a large number of relatively short channels for cooling fluid flow, thus reducing the pressure drop and circulatory power requirements. The gaskets and manifolds allow for a more simple manifold structure than previously utilized.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
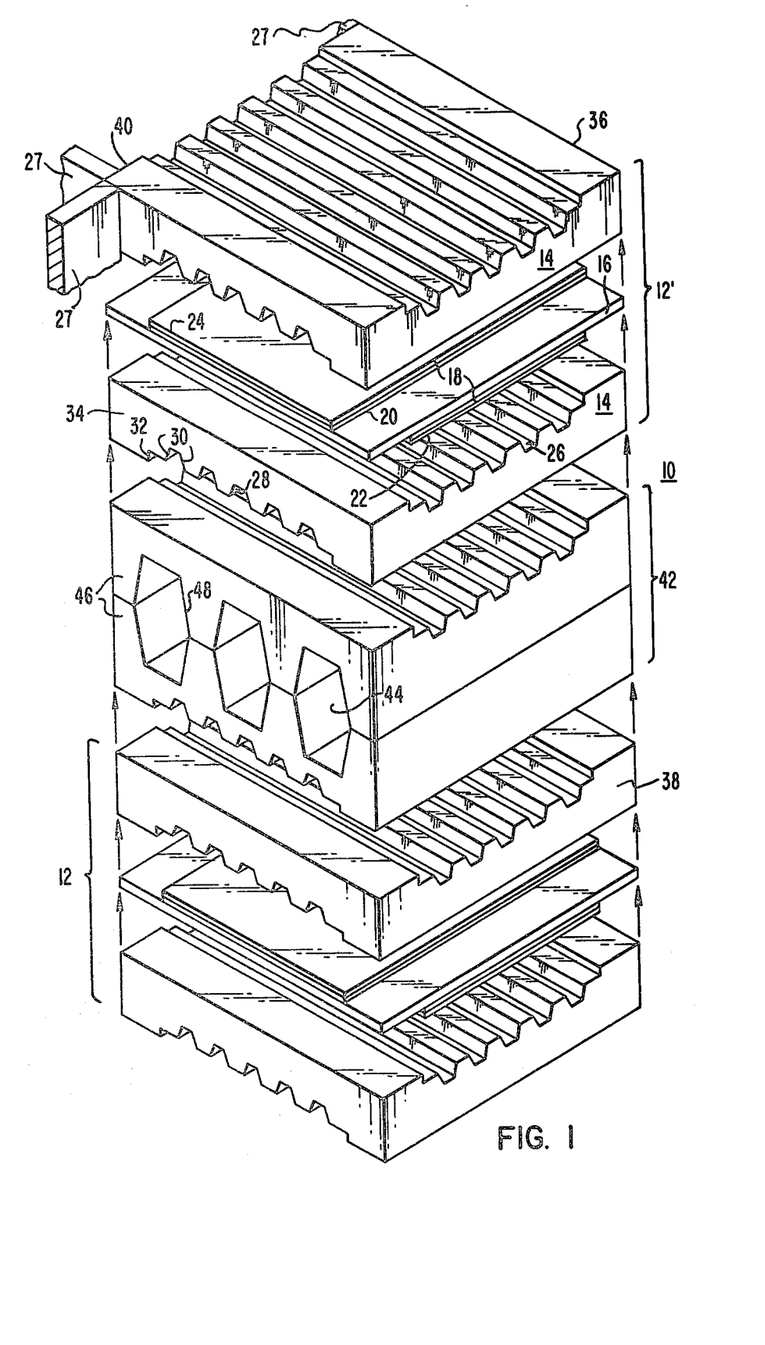
FIG. 1 is an expanded perspective view of a fuel cell stack showing primary components.

Referring now to FIG. 1, there is shown an electrochemical fuel cell system. The system includes a plurality of repeating fuel cells 12 arranged in a stack 10 such that the cells 12 are electrically connected in series. Cell stacks can also be arranged in parallel.

An individual cell, such as the cell 12', includes two bipolar plates 14 between which are sandwiched an electrolyte, for example, in the form of a porous graphite matrix 16 saturated with an acid such as phosphoric acid. Many other materials and structures which incorporate an electrically insulating material can also be utilized. The plates 14 can comprise a material such as compression molded graphite-resin composite disposed on opposite sides of the electrolyte matrix 16 or electrodes 18, such as a cathode 20 and anode 22. Each electrode 18 can also be of a porous graphite material provided with a porous graphite fiber backing 24 for added structural integrity.

The bipolar plates 14 are provided with a set of process channels, including the fuel channels 26 and the oxidant channels 28. The channels 26, 28 are generally rectangular with slightly slanted edges 30 to facilitate fabrication as necessary, for example, to remove a fabrication die. The bipolar plates 14 also include grooves 32 matingly configured to receive the electrodes 18. Thus, when held together by means well known, such as bonding materials and/or an external frame, each cell represents a substantially sealed unit.

An oxidant, such as a halogen, or air or other oxygen-containing material, flows through the oxidant channels 28, and a fuel, such as hydrogen, organics or metals, flows through the fuel channels 26. Electrical power and heat are generated by the interaction of the fuel and oxidant through the electrodes and electrolyte matrix 16. An exemplary fuel cell 12 utilizes hydrogen fuel, air as the oxidant and phosphoric acid as the electrolyte.

A substantial amount of heat is generated by the electrochemical reaction, and, accordingly, the system stack 10 includes cooling modules 42. Dependent upon the operating temperatures desired, the cooling modules 42 are placed between fuel cells 12 at selected positions within the stack 10. A cooling module 42 may, for example, be placed between approximately every third cell to every eighth cell.

Each cooling module 42 is preferably comprised of a material similar to that of the bipolar plates 14, compression molded graphite-resin composite in the exemplary system. The cooling module 42 includes a plurality of cooling passages 44, separated by ribs 45. The cooling module 42 can be formed of one piece, although, as shown, two sections 46 are preferably separately fabricated and subsequently sealed together. The cooling passages 44 are preferably substantially rectangular, although other geometric shapes are equally possible. Where the cooling module is formed in two sections 46, cooling passage edges 48 are preferably slanted slightly, as are the fuel cell channels 28, approximately seven degrees from the vertical, to accommodate fabrication. A cooling fluid, such as air, flows through the cooling passages.

Additional detail relative to these structures is provided in the two cross-referenced concurrently filed U.S. patent applications Ser. Nos. 144,088, and 144,090.

Figure 2:
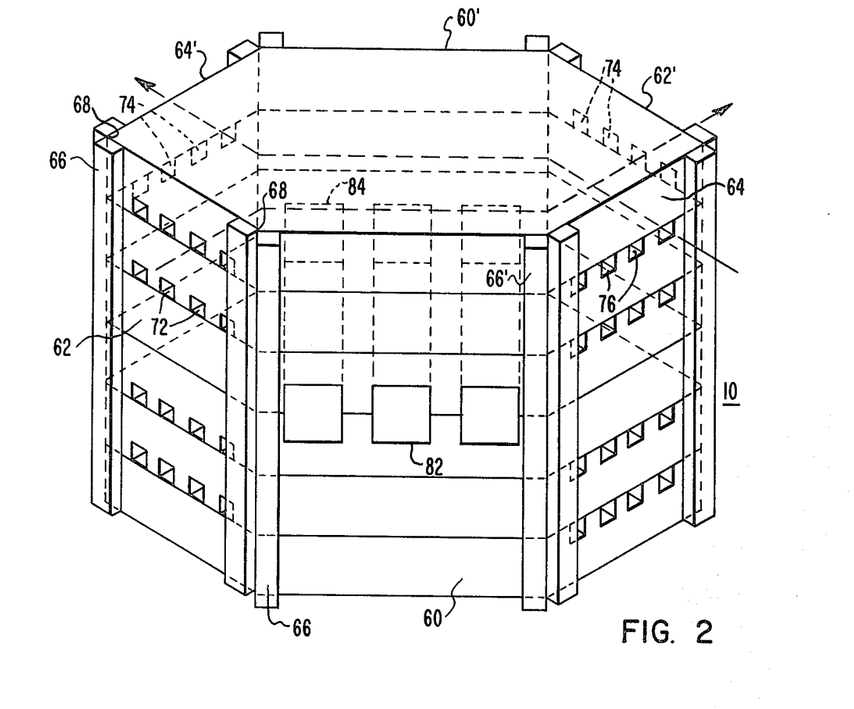
FIG. 2 is a perspective view of a hexagonal fuel cell stack in accordance with the invention.
Figure 3:
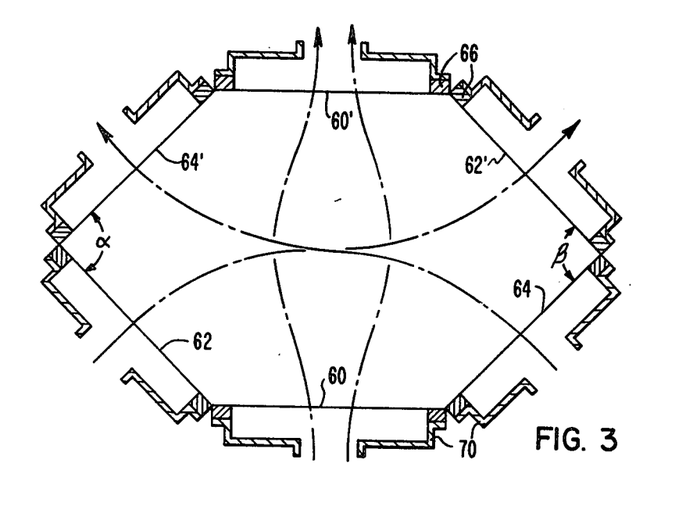
FIG. 3 is a schematic plan view of a hexagonal fuel cell stack particularly showing features of a sealed manifold arrangement in accordance with the invention.

Referring now to FIGS. 2 and 3, there is shown a preferred configuration for a fuel cell stack 10 and system wherein the cross-sectional shape of the stack 10, and the individual components such as the bipolar plates 14 and cooling module 42, is that of an elongated polygon having pairs of oppositely disposed substantially parallel faces 60, 62, 64, such as the pair 60 and 60', the pair 62 and 62', and the pair 64 and 64'. The term elongated, as used herein and in the appended claims, refers to a polygon wherein the faces of one pair are longer than the faces of the remaining pair(s). The distance across flats, between opposed faces, is shorter between the longer pair of faces than between any other pairs. In FIG. 2, the elongated faces are identified by reference numerals 60 and 60'.

Figure 9:
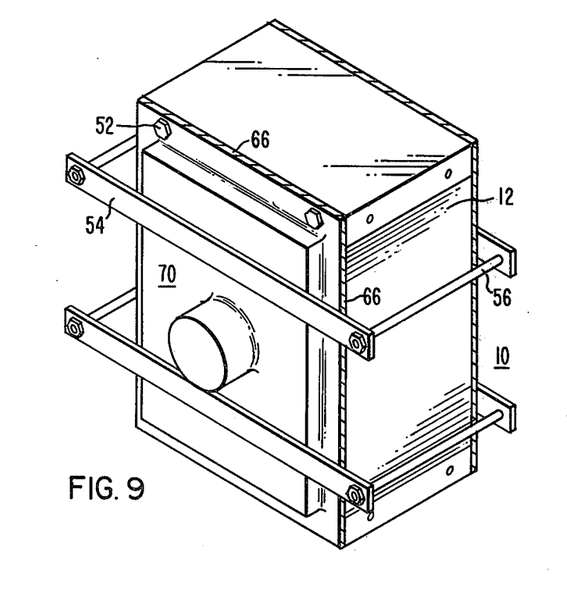
FIG. 9 is a perspective view showing fastening structures for a fuel cell stack in accordance with the invention.

Gaskets 66 are affixed at the six corners 68 of the hexagon to form a seal for fluid conduits or manifolds 70. The gaskets can be one piece at each corner, although preferably two gaskets are provided at each corner 68 as shown best in FIG. 3. This arrangement allows the gaskets 66 to be readily affixed to a flat surface at each face of the stack. The gaskets are preferably comprised of VITON, a fluorocarbon material commercially available from the DuPont Corporation, and sealed to the stack and ducts by mechanical fastening means. For example, FIG. 9 shows support plates 50 at the top and bottom of a vertical fuel cell stack 10. The gaskets 66 along one face of the stack are sandwiched between the manifolds 70 and the stack by bolts 52 which extend into the support plates. Additionally, tie bars 54 and tie rods 56 are used to further maintain a seal among the components. The ducts are comprised of aluminum or other metals coated internally with a material which is resistant to corrosion by species in the cell environment, such as phosphoric acid. A VITON spray can be utilized.

The fluid mediums are thus sealingly ducted into and out of the stack. The fuel and oxidant are arranged to flow in generally opposite directions. Fuel is ducted to fuel inlets 72, flows through the fuel channels 26, and exits the stack 10 through fuel outlets 74. Oxidant is ducted to oxidant inlets 76, flows through oxidant channels 28, and exits the stack 10 through oxidant outlets 78. As shown by the broken flow lines 80, the flow channels 26, 28 are preferably arranged in three segments, the inlet and outlet segments being generally perpendicular to the entrance and exit faces and a central segment being generally parallel to the long faces 60, 60'. The fuel 26 and oxidant channels 28 are, however, similarly configured. Further, these channels have the same lengths and similar pressure drops where, as shown best in FIG. 3, angles alpha ($\alpha$) and beta ($\beta$) are right angles. The channels 26, 28 can also be arranged to vary the flow area in reacting contact with the electrolyte as described in the cross-referenced application Ser. No. 144,088.

Figure 4:
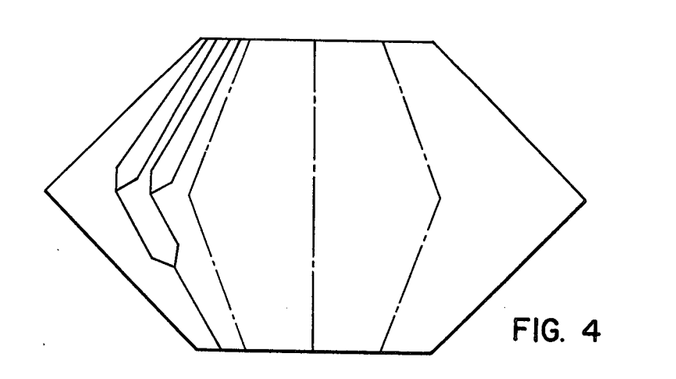
FIG. 4 is a schematic plan view of a hexagonal fuel cell stack showing an alternate cooling flow path arrangement.

The cooling fluid is ducted to cooling passage entries 82, flows through cooling passages 44, and exits the stack 10 through cooling exits 84. The cooling passages 44 are preferably arranged to provide variable cooling, as described in the cross-referenced application Ser. No. 144,090, and illustrated as branching passages in FIG. 4. The elongated polygonal configuration allows adequate cooling to be maintained while experiencing a low pressure drop since a large number of shorter cooling paths can be utilized.

Figure 5:
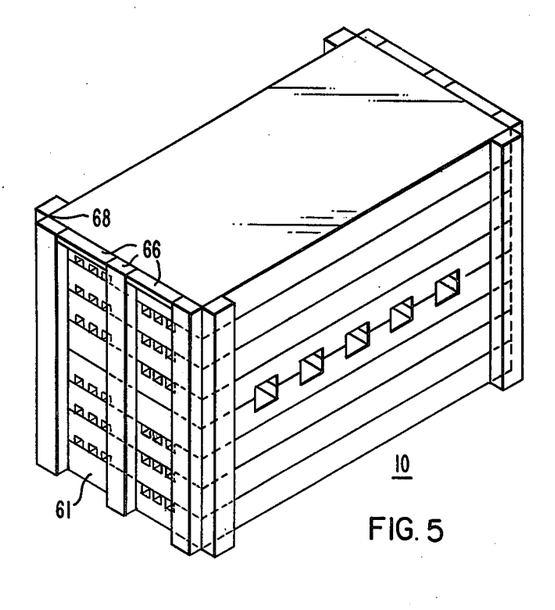
FIG. 5 is a perspective view of a rectangular fuel cell stack in accordance with the invention.
Figure 6:
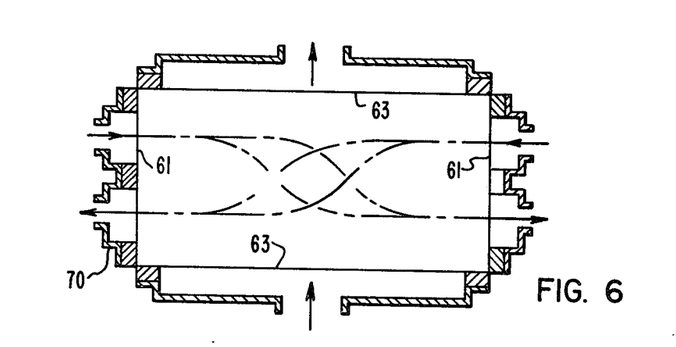
FIG. 6 is a schematic plan view of a rectangular fuel cell stack particularly showing features of a sealed manifold arrangement in accordance with the invention.
Figure 7A:
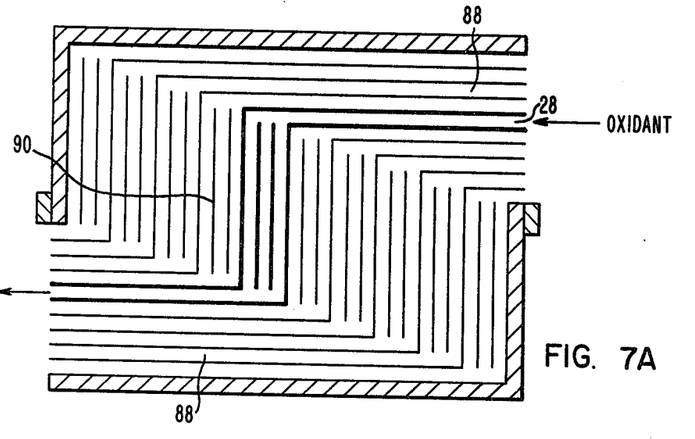
FIGS. 7A and 7B are cross-sectional plan views of selected portions of a rectangular fuel cell stack in accordance with the invention.
Figure 7B:
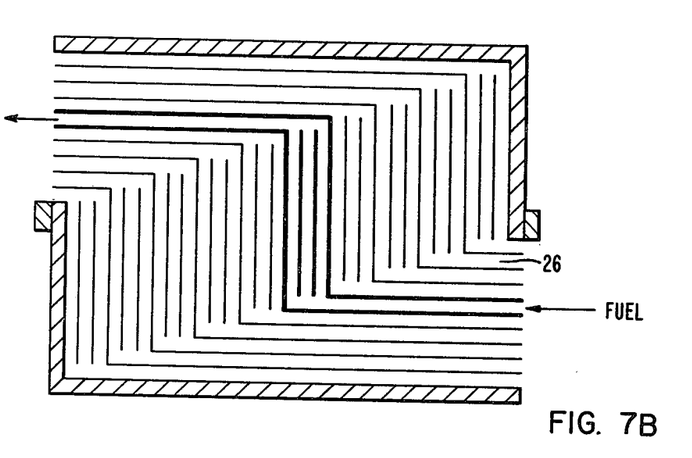

Referring now to FIGS. 5, 6 and 7, there is shown an alternate stack 10 configuration. Here the stack 10 is rectangular, and can be viewed as the structure of FIG. 3 with the modification that angles alpha ($\alpha$) and beta (β) are each 180 degrees. Additionally, sealing gaskets 66 are provided not only at the four corners 68, but also at an intermediate position on each of the two shorter faces 61. Accordingly, the fuel and oxidant manifolds 70 are each sealed to the stack through one gasket 66 at a corner and another longitudinally extending gasket 66 at the intermediate position.

Figure 8:
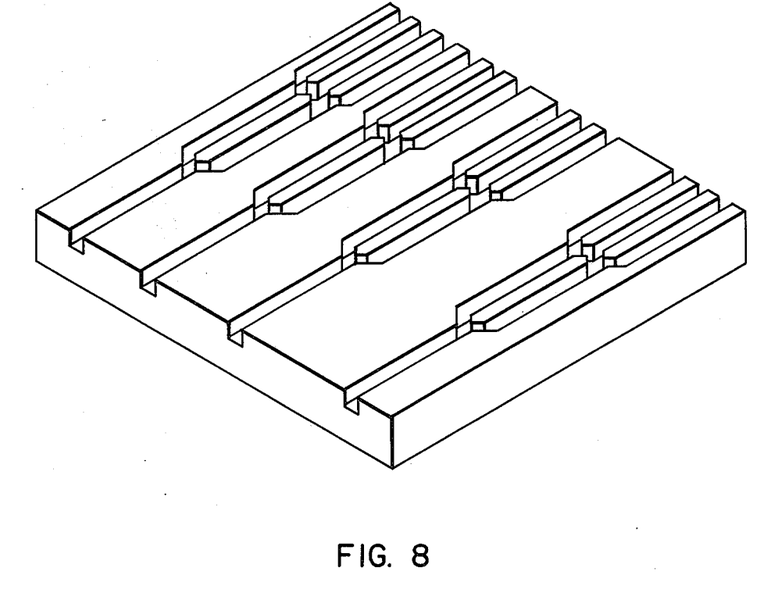
FIG. 8 is a schematic plan view of a rectangular fuel cell stack showing an alternate cooling flow path arrangement.

The cooling passages 44 extend between the long faces 63, thus defining a shorter flow path than the fuel and oxidant channels. As shown in FIG. 8, variable area branched cooling passages can readily be incorporated.

The fuel 26 and oxidant 28 channels are preferably arranged so that fuel and oxidant flow in generally opposite directions in a counterflow pattern with segments generally parallel and perpendicular to the faces, shown best in FIGS. 7A and 7B. The configuration shown provides a reactant geometry wherein the fuel and oxidant channels have the same flow characteristics, providing uniform flow distribution of reactants and similar pressure drops. Parallel channel segments 86 and 88 are joined by a cross-over segment 90. Although the segments 86, 88 are shown as having one channel each, multiple channels can also be provided. The cross-over segment 90 contains a group of parallel channels selected to maintain the channel spacing approximately uniform over the active area of the entire fuel cell. For the aspect ratio of the rectangular configuration shown, the cross-over segment 90 has three channels for each parallel inlet segment. A single oxidant channel and a single fuel channel have been highlighted in FIGS. 7A and 7B for clarity.

The disclosed configurations retain the benefits of a once-through system, such as improved voltage output. The rectangular stack configuration offers advantages relative to a polygon having a larger number of faces, being easier to fabricate. The rectangular configuration also provides additional face area at the inlet and outlet of the cooling passages which allows, for a given minimum rib thickness between passages, more branched channels at the cooling exit, significantly reducing pressure drop. This configuration similarly provides greater separation of cooling passages at the inlet face, allowing the use of larger inlets which more easily maintain laminar flow and associated improved temperature uniformity. The rectangular configuration also permits the maintenance of a constant ratio of the rib cross section to the cooling passage cross section. This enhances fabrication of cooling module sections 46 which are of uniform thickness. And, the disclosed manifold and gasket arrangement provides a simple and reliable manner in which to transfer the fluid mediums to and from the fuel cell stack.

Since numerous changes may be made in the above described arrangements without departing from the spirit and scope thereof, it is intended that all matter contained in the foregoing description or shown in the accompanying drawings be interpreted as illustrative, and not in a limiting sense.

We claim:

1. An electrochemical cell system comprising:
   a plurality of electrically connected fuel cells and at least one cooling module disposed between selected fuel cells, said fuel cells and cooling module arranged in a stack and shaped in cross section as an elongated polygon having pairs of oppositely disposed peripheral faces, at least one pair of peripheral faces being longer than the remaining pairs and disposed such that the distance between said opposite longer pair of peripheral faces is shorter than the distance between the opposite peripheral faces of the remaining pairs;
   each said fuel cell having an electrolyte positioned between a pair of bipolar plates, said bipolar plates defining oxidant channels for transporting an oxidant in reacting communication with said electrolyte, and fuel channels for transporting a fuel in reacting communication with said electrolyte, said fuel and oxidant channels each having an inlet on one shorter peripheral face of said polygon and an outlet on an opposite shorter peripheral face;
   said cooling module having cooling passages, said passages having an entry on one peripheral face of said polygon and an exit on an opposite peripheral face, said entry and exit being disposed on said longer peripheral faces of said polygon.

2. The electrochemical cell system of claim 1 further comprising a plurality of conduit structures each sealed to a peripheral face of said stack and forming an ingress manifold common to each fuel channel inlet, an egress manifold common to each fuel channel outlet, an ingress manifold common to exit oxidant channel inlet, an egress manifold common to each oxidant channel outlet, an ingress manifold common to each cooling passage entry, and an egress manifold common to each cooling passage exit.

3. The electrochemical cell system of claim 2 wherein said elongated polygon is an elongated hexagon having six peripheral faces and six corners, and wherein each of said manifolds is sealed to a different one of said six peripheral faces.

4. The electrochemical cell system of claim 3 wherein each said manifold is sealed to a respective peripheral face by gaskets disposed at said corners.

5. The electrochemical cell system of claim 2 wherein said elongated polygon is a rectangle having four peripheral faces and four corners, said cooling passage ingress and egress manifolds being sealed to said longer peripheral faces, said fuel channel ingress manifold being sealed to the same peripheral face as said oxidant channel egress manifold, and said fuel channel egress manifold being sealed to the same peripheral face as said oxidant channel ingress manifold.

6. The electrochemical cell system of claim 5 wherein said cooling passage ingress and egress manifolds are sealed to said respective peripheral faces by gaskets disposed at said corners and each said fuel channel and oxidant channel manifold is sealed to said respective peripheral face by a gasket disposed at one corner and by another gasket disposed at an intermediate position along the respective peripheral face.

7. The electrochemical cell system of claim 1 wherein said elongated polygon is a hexagon having two 90° angles.

8. An electrochemical cell system comprising:
   a plurality of electrically connected fuel cells and a cooling module disposed between selected fuel cells, said fuel cells and cooling module arranged in a stack and shaped in cross section as an elongated hexagon having three pairs of oppositely disposed, substantially parallel peripheral faces, the faces of one of said pairs being longer than the faces of the remaining pairs and disposed such that the distance between the faces of said one pair is shorter than the distance between the faces of the remaining pairs;

each said fuel cell having an electrolyte positioned between a pair of bipolar plates, said plates defining oxidant channels and fuel channels, said oxidant channels having an inlet on one face of one of said remaining pairs and an outlet on the oppositely disposed face, said fuel channels having an inlet on one face of the other of said remaining pairs and an outlet on the oppositely disposed face;

said cooling module defining cooling passages having an entry on one face of said longer pair and an exit on the oppositely disposed face.

9. The system of claim 8 wherein said elongated hexagon has two 90° angles.

10. The system of claim 8 wherein said oxidant channels comprise three segments, a first segment generally perpendicular to the face of said oxidant inlet, a second segment generally parallel to said longer faces, and a third segment generally perpendicular to the face of said oxidant outlet.

11. The system of claim 10 wherein said fuel channels comprise three segments, a first segment generally perpendicular to the face of said fuel inlet, a second segment generally parallel to said longer faces, and a third segment generally perpendicular to the face of said fuel outlet.

12. An electrochemical cell system comprising:

a plurality of electrically connected fuel cells and a cooling module disposed between selected fuel cells, said fuel cells and module arranged in a stack and shaped in cross section as a rectangle having two pairs of oppositely disposed, substantially parallel peripheral faces, the faces of one of said pairs being longer than the faces of the other shorter pair, each said fuel cell having an electrolyte positioned between a pair of bipolar plates, said plates defining oxidant channels and fuel channels, said oxidant and fuel channels each having an inlet and an outlet, said oxidant inlet and said fuel outlet being positioned on one of said shorter faces, separated along said one shorter face by an intermediate gasket, and said oxidant outlet and fuel inlet being positioned on said other shorter face, separated along said other shorter face by an intermediate gasket, gaskets for sealing, in conjunction with said intermediate gaskets, manifolds to said shorter faces including a manifold common to said oxidant inlets, a manifold common to said oxidant outlets, a manifold common to said fuel inlets and a manifold common to said fuel outlets, said cooling module defining cooling passages having an entry on one of said longer faces and an exit on the oppositely disposed face, and manifolds sealed to each of said longer faces, one of said manifolds being common to said entries of said cooling passages and another one of said manifolds being common to said exits of said cooling passages.

13. The system of claim 12 wherein said fuel channels comprise three segments, a first segment substantially parallel to said longer faces, a crossover segment substantially perpendicular to said longer faces, and a third segment substantially parallel to said longer faces.

14. The system of claim 13 wherein the cross sectional area of said crossover segment is larger than the cross-sectional area of either of said other segments.

15. The system of claim 12 wherein said oxidant channels comprise three segments, a first segment substantially parallel to said longer faces, a crossover segment substantially perpendicular to said longer faces, and a third segment substantially parallel to said longer faces.

* * * * *

UNITED STATES PATENT AND TRADEMARK OFFICE
CERTIFICATE OF CORRECTION

PATENT NO. : 4,276,355

DATED : June 30, 1981

INVENTOR(S) : Richard E. Kothmann & Joseph A. Cyphers

It is certified that error appears in the above-identified patent and that said Letters Patent are hereby corrected as shown below:

Column 1, line 16, change "144,088" to -- 144,090 --.

Column 1, line 17, delete "Ser. No. 144,088,".

Signed and Sealed this

Twenty-fourth Day of November 1981

[SEAL]

Attest:

Attesting Officer

GERALD J. MOSSINGHOFF

Commissioner of Patents and Trademarks